Patented Feb. 14, 1950

2,497,376

UNITED STATES PATENT OFFICE 2,497,376

PROCESS OF PRODUCING FILMS

John Cuthbert Swallow and Donald Kenneth Baird, Welwyn Garden City, and Bertram Pusey Ridge, Potters Bar, England, assignors to Imperial Chemical Industries Limited, a corporation of Great Britain No Drawing. Application March 21, 1947, Serial No. 736,393. In Great Britain March 30, 1946

1 Claim. (Cl. 18—57)

This invention relates to improvements in artificial films.

The object of the present invention is the production of new and improved artificial films. A further object is the production of films of low water absorption. A still further object is the production of films of high electrical resistivity. Another object is the production of films which are resistant to abrasion, are scarcely influenced by ultra violet light or by many organic liquids and most acids and acid fumes. Yet another object is the production of films which may be sealed to themselves by heating, e. g. by high frequency electrical heating.

According to the present invention these objects are accomplished by a process wherein a solution of one or more highly polymeric linear esters is formed into a thin layer on a smooth surface, which is covered with a separating aid if desired, evaporating substantially all the solvent from this layer at a rate sufficiently slow to prevent the formation of bubbles and stripping the film so formed from said smooth surface, said polymeric esters being esters obtained by heating one or more glycols of the series $HO(CH_2)_nOH$, where $n$ is an integer greater than 1 but not exceeding 10, with terephthalic acid or an ester forming derivative thereof.

For the polymeric esters of this invention we mean, by highly polymeric linear esters, polyesters capable of being formed into filaments which can be extended by drawing and then show, by characteristic X-ray patterns, molecular orientation along the filament axis. Examples of ester-forming derivatives of terephthalic acid are its aliphatic (including cycloaliphatic) and aryl esters and half esters, its acid halides and its ammonium and amine salts. Examples of said glycols are ethylene, trimethylene, tetramethylene, hexamethylene and decamethylene glycols. Of the said polymeric esters polyethylene terephthalate, or more technically correct, polymeric ethylene terephthalate, is preferred because of the ready availability of the materials from which it is synthesised and because of its high melting point which is about 240° C.

Suitable solvents for use in the said solution of polymeric ester includes phenols, particularly o-cresol and m-cresol; nitrobenzene, and chlorinated compounds such as tetrachlorethane. The commercial mixture of ortho-, meta-, and paracresol known as cresylic acid is a satisfactory solvent which is readily available. More concentrated solutions can be obtained by using suitable mixtures of solvents, such as m-cresol and chloroform. It is preferred that the solution applied to said smooth surface is heated to the temperature at which it is intended to evaporate the solvent before the solution contacts the said smooth surface. We have found that the rate of solution of the polymer is increased by converting it to its amorphous state prior to dissolving it. This is effected by heating it above its melting point, quenching it rapidly with cold water, and drying.

The materials suited for the fabrication of said smooth surfaces are metals, particularly those metals which retain a good surface finish, and glass. Metals such as steels have the advantage that they may be formed into continuous belts on which the process of this invention may be operated continuously. Suitable separating aids for coating the smooth surfaces are high melting point greases and aluminium stearate.

The removal of solvent from the film must take place at a temperature below the boiling point of the solvent to avoid bubbles forming in the film. Normally the temperature is maintained about 30° C. below the boiling point of the solvent and when almost all the solvent has been removed, the temperature is raised to about 5° C. less than the boiling point of the solvent to ensure that as much solvent as possible is removed. It will be appreciated that the time of heating depends upon the thickness of the film and the temperature used. Reduced pressures may be used to assist the removal of solvent and to avoid the use of unduly high temperatures during their removal.

It is preferred that the films of this invention should be quenched after the removal of the solvent, as if the films cool slowly there is a tendency for the resultant film to be brittle; such brittle films are difficult to orient.

It is also preferred that the films of this invention are oriented, after quenching. This may be done by drawing, rolling or stamping and the resultant films have improved tensile strength, moduli of elasticity and resistance to moisture, organic liquids, acids and other chemical reagents. It is further preferred that the orientation should take place both laterally and longitudinally as by this means films having good tensile strength along both lateral and longitudinal axes are produced.

The film after the solvent has been removed and while at a temperature equal to or greater than its melting point may be quenched by any process known in the art. While still in contact with the forming surface the film may for example be subjected to a blast of cold inert gas or may be immersed suddenly in a bath of cold inert liquid.

The following example illustrates but does not limit the scope of our invention.

Example 8 grams of dry, quenched, polyethylene terephthalate was dissolved in 25 grams of cresylic acid at 190° C. and 0.016 gram of aluminate stearate stirred in. The hot solution was poured into a flat, polished, stainless steel dish, 13.5" diameter with vertical walls, the dish having been previously heated to the same temperature as the solution. The dish was floated in a deep trough containing high boiling mineral oil at 190° C., to a depth of 4", a current of nitrogen passing into the trough from a tube attached to the top of the inside wall of the trough and pointing diagonally downwards. The whole apparatus was placed in a thermostatically controlled air oven set to give an air temperature of 190° C. and allowed to stand for 24 hours, after which the oven temperature was raised to 220° C. for a further 2 hours. Immediately after heating the dish was removed from the trough and thrust into cold water. A clear film of polyethylene terephthalate 0.003" thick formed in the dish which on removal was found to have a tensile strength of 6,100 lbs. per sq. in. and an elongation of 230%.

A strip of the film 6" x 2" was hand-drawn in a bath of mineral oil at 76° C. using metal grips to hold the ends of the strip beneath the surface of the liquid. An extension to approximately five times the original length was obtained, and the sample after stretching was found to have increased in tensile strength to 13,000 lbs. per sq. in., the elongation being reduced to 12%.

Films produced by the process of this invention are particularly useful for purposes of electrical insulation. They have for example, good dielectric properties, e. g. low power factor, good dielectric strength and high volume resistivity.

As the films produced have high strength, these films have many useful outlets where good electrical properties, high strength and thermostability are required.

The resistance to acids and organic liquids of the films of this invention is also good, for example, immersion in hot or cold weak acids does not damage these films, nor are they affected by naphtha, petrol or carbon tetrachloride. Such films therefore are particularly useful for dielectrical insulation where resistance to acids is required.

The fact that the films of this invention can be rolled or drawn to give very thin films makes them particularly suitable for electrical applications which require a non-bulky material having good insulating properties which is not easily damaged by rise in temperature. Such uses include insulation of wireless parts and condensers of all types.

The films of this invention are also well suited as wrapping materials, e. g. in moistureproof packages, and for the fabrication of water-proof garments, because of their good abrasion resistance, good weathering properties and ease of sealing by heating; as protective aprons and clothing, for the same reasons and because of their resistance to attack by acids and many organic liquids; as curtains, for the same reasons and because they are not affected by ultra violet light; and for lapping around electric cables because of their good weathering properties and because they are not influenced appreciably by moisture. A particularly useful method of using these films as wrapping materials is to wrap a drawn film round the article concerned, seal the edges of the film to form a closed package and then to shrink this package on to the wrapped article by means of heating. The film being drawn but not heat set has a high degree of shrinkage and fits closely to the wrapped article.

We claim:

A process for the production of polymeric ethylene terephthalate films which comprises melting polymeric ethylene terephthalate, rapidly quenching it, dissolving the quenched polymer in a volatile solvent, depositing a thin layer of the solution on a smooth surface, evaporating the solvent from the layer at a rate sufficiently slow to prevent the formation of bubbles to form a film of the dissolved polymer, quenching the resulting film by immersion in cold water, stripping the quenched film from the smooth surface and thereafter orienting the film by drawing.

JOHN CUTHBERT SWALLOW.
DONALD KENNETH BAIRD.
BERTRAM PUSEY RIDGE.

REFERENCES CITED

The following references are of record in the file of this patent:

UNITED STATES PATENTS

| Number | Name | Date |
|---|---|---|
| 2,141,169 | Catlin | Dec. 27, 1938 |
| 2,219,700 | Perrin | Oct. 29, 1940 |
| 2,312,879 | Christ | Mar. 2, 1943 |
| 2,437,046 | Rothrock, Jr. | Mar. 2, 1948 |

FOREIGN PATENTS

| Number | Country | Date |
|---|---|---|
| 578,079 | Great Britain | June 14, 1946 |